United States Patent
Jung

(10) Patent No.: US 10,906,669 B2
(45) Date of Patent: Feb. 2, 2021

(54) CRACK PEPAIR METHOD FOR INHIBITING CRACK GROWTH IN WALL PORTION BY USING ULTRASONIC WAVE

(71) Applicant: INDUSTRY-ACADEMIC COOPERATION FOUNDATION, DANKOOK UNIVERSITY, Yongin-si (KR)

(72) Inventor: Sunghwan Jung, Yongin-si (KR)

(73) Assignee: NDUSTRY-ACADEMIC COOPERATION FOUNDATION, DANKOOK UNIVERSITY, Yongin-si (KR)

(*) Notice: Subject to any disclaimer, the term of this patent is extended or adjusted under 35 U.S.C. 154(b) by 69 days.

(21) Appl. No.: 16/329,416

(22) PCT Filed: Aug. 30, 2017

(86) PCT No.: PCT/KR2017/009498
§ 371 (c)(1),
(2) Date: May 17, 2019

(87) PCT Pub. No.: WO2018/044074
PCT Pub. Date: Mar. 8, 2018

(65) Prior Publication Data
US 2019/0283903 A1    Sep. 19, 2019

(30) Foreign Application Priority Data
Aug. 31, 2016    (KR) .................... 10-2016-0111860

(51) Int. Cl.
*B64F 5/40*        (2017.01)
*B29C 65/52*    (2006.01)
(Continued)

(52) U.S. Cl.
CPC ............ *B64F 5/40* (2017.01); *B29C 65/52* (2013.01); *C21D 10/00* (2013.01); *B29C 73/025* (2013.01);
(Continued)

(58) Field of Classification Search
CPC ....... B29C 73/00; B29C 73/02; B29C 73/025; B29C 73/16; B29C 73/163; B29C 73/166;
(Continued)

(56) References Cited

U.S. PATENT DOCUMENTS 6,002,102 A * 12/1999 Dulaney ................ B23K 26/06
                                                                219/121.85
6,338,765 B1    1/2002 Statnikov
(Continued)

FOREIGN PATENT DOCUMENTS

JP        59193215 A  * 11/1984   ............... C21D 7/04
JP    2004-169099 A    6/2004
(Continued)

*Primary Examiner* — Philip C Tucker
*Assistant Examiner* — Brian R Slawski
(74) *Attorney, Agent, or Firm* — Novick, Kim & Lee, PLLC; Jae Youn Kim; Jihun Kim

(57) ABSTRACT

There is provided a crack repairing method for suppressing a crack growth in a wall portion. The crack repairing method includes an injection step in which working fluid is injected into a crack formed into a surface of the wall portion of a target object and a vibration step in which vibration is applied to the working fluid in a direction from an crack initiation portion of the crack on the surface to an inner end portion of the crack. The crack repairing method further includes a deformation step in which a cavity is generated in the working fluid by the applied vibration and compressive residual stress is generated at the inner end portion of the crack.

3 Claims, 5 Drawing Sheets

(51) Int. Cl.
  *C21D 10/00* (2006.01)
  *G21C 13/02* (2006.01)
  *B29C 73/16* (2006.01)
  *B29C 73/26* (2006.01)
  *B29C 73/02* (2006.01)
  *B29C 73/18* (2006.01)
(52) U.S. Cl.
  CPC ............ *B29C 73/166* (2013.01); *B29C 73/18* (2013.01); *B29C 73/26* (2013.01); *B32B 2310/028* (2013.01); *G21C 13/02* (2013.01); *Y02E 30/30* (2013.01); *Y02P 10/20* (2015.11)
(58) Field of Classification Search
  CPC ......... B29C 73/18; B29C 73/24; B29C 73/26; B29C 65/00; B29C 65/48; B29C 65/52; B29C 65/54; B29C 65/542; B29C 65/524; B29C 65/525; B29C 65/08; B29C 65/081; B29C 65/083; B29C 65/088; B29C 73/54; B29C 73/542; B29C 73/524; B29C 73/525; B29C 73/08; B29C 73/081; B29C 73/083; B29C 73/088; B29C 2791/008; B32B 17/10963; B32B 2310/028; B32B 15/04; B32B 15/043; E04G 23/0203; E04G 23/0211; B29L 2031/3082; B64F 5/40; C21D 10/00; C21D 7/00; C21D 7/02; C21D 7/04; C21D 7/06; C21D 2221/00; C21D 2221/02; C21D 2221/10; B23K 20/10; B23P 9/00; B23P 9/02; B23P 6/04; Y02E 30/30; Y02P 10/20; G21C 13/02; G21C 19/00; Y10T 428/20; Y10T 29/47; Y10T 29/479; Y10T 29/49318; Y10T 29/49718; Y10T 29/49746

USPC ....... 156/60, 64, 73.1, 73.6, 77, 94, 98, 278, 156/349, 378, 391, 423, 579, 580.1, 156/580.2; 428/63; 29/90.01, 90.7, 29/402.01, 402.09, 402.11, 402.13, 29/402.16, 402.18; 228/119; 52/514, 52/514.5, 741.1, 741.4, 741.41, 742.1, 52/742.13, 742.16; 148/95, 558; 72/362

See application file for complete search history.

(56) References Cited

U.S. PATENT DOCUMENTS

| | | | | |
|---|---|---|---|---|
| 2003/0029845 | A1* | 2/2003 | Tamura | B23K 35/0227 219/121.64 |
| 2004/0245323 | A1* | 12/2004 | Offer | B23K 9/0061 228/219 |
| 2004/0250584 | A1* | 12/2004 | Offer | C21D 7/04 72/56 |
| 2007/0033980 | A1* | 2/2007 | Nishimura | B23P 6/04 72/362 |
| 2008/0223099 | A1* | 9/2008 | David | B24C 1/10 72/53 |
| 2012/0304577 | A1* | 12/2012 | Reid | E04G 23/0244 52/514.5 |
| 2014/0224032 | A1* | 8/2014 | Mouri | G01N 3/08 73/799 |
| 2016/0348223 | A1* | 12/2016 | Groth | B23K 26/035 |

FOREIGN PATENT DOCUMENTS

| | | |
|---|---|---|
| JP | 2005-152956 A | 6/2005 |
| KR | 10-2005-0086683 A | 8/2005 |
| KR | 10-2008-0050519 A | 6/2008 |
| RU | 2047454 C1 * | 11/1995 |

* cited by examiner

CRACK REPAIR METHOD FOR INHIBITING CRACK GROWTH IN WALL PORTION BY USING ULTRASONIC WAVE

TECHNICAL FIELD

The present disclosure relates to a crack repair method for suppressing a crack growth in a wall portion by using ultrasonic wave.

BACKGROUND

When a crack is generated on and into a surface of a metal wall of a target object such as an aircraft, a reactor pressure vessel or the like that are driven under harsh (intolerable) environments, stress is concentrated at an inner end portion (crack-tip) of the crack leading to the crack growth. Conventionally, when such a surface cracking occurs, an adhesive such as epoxy is coated inside of the crack in order to prevent the development of the crack growth. However, in the case that the crack is filled with the epoxy, additional bonding between the epoxy and the crack portion is required.

However, a high thermal stress cracking occurs in, e.g., aircraft turbine blades or reactor pressure vessels that are driven under the harsh environments, which results in stress crack corrosion. Therefore, it is difficult to stably maintain the bonding between the crack and the adhesive under such environments.

SUMMARY

In view of the above, the present disclosure provides a method capable of effectively suppressing a crack growth even under harsh environments.

In accordance with an embodiment of the present disclosure, there is provided a method for suppressing a crack growth in a wall portion, the method including: an injection step for injecting working fluid into a crack formed at a surface of the wall portion of a target object; a vibration step for applying vibration to the working fluid in a direction from a crack initiation portion of the crack to an inner end portion of the crack; and a deformation step for generating a cavity in the working fluid within the crack by the applied vibration and generating compressive residual stress at the inner end portion of the crack.

Further, the vibration step may include a tube installation step for installing a fixing tube at the crack initiation portion of the crack and a vibration-applying-device fixing step for fixing one or more tips of a vibration applying device at the crack through the fixing tube. The one or more tips are comprised in the vibration applying device which generates ultrasonic waves, and the vibration may be applied by using the one or more tips of the vibration applying device.

Further, the one or more tips of the vibration applying device may include multiple tips to perform parallel processing, and a distance between the tips of the vibration applying device may be greater than or equal to $1/100$ and smaller than or equal to $1/5$ of a wavelength of the vibration applied by the vibration applying device.

Effect of the Invention

In accordance with the embodiment of the present disclosure, it is possible to effectively suppress the crack growth even under the harsh environments.

DETAILED DESCRIPTION

Figure 1:
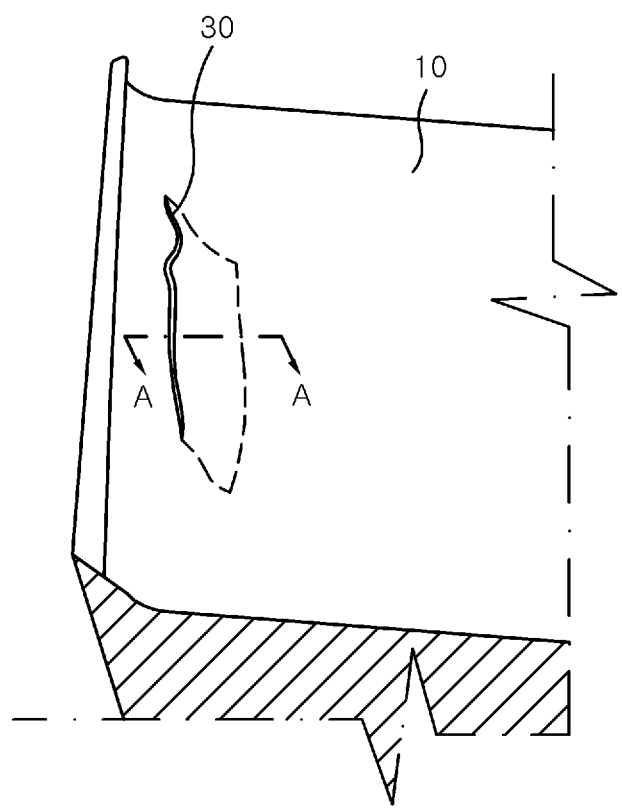
FIG. 1 is a conceptual diagram showing a crack generated on a surface of a target object.

Hereinafter, specific embodiments for implementing the idea of the present disclosure will be described in detail with reference to the accompanying drawings.

In the following description of embodiments of the present disclosure, the detailed descriptions of known functions or configurations incorporated herein will be omitted when it is determined that the detailed descriptions may unnecessarily obscure the subject matter of embodiments of the present disclosure.

Further, in the following description of embodiments of the present disclosure, the definitions of the terms such as "inner", "outer", and the like should be determined based on directions in the drawings. However, such terms can be differently expressed when a direction of a target is changed.

Figure 2:
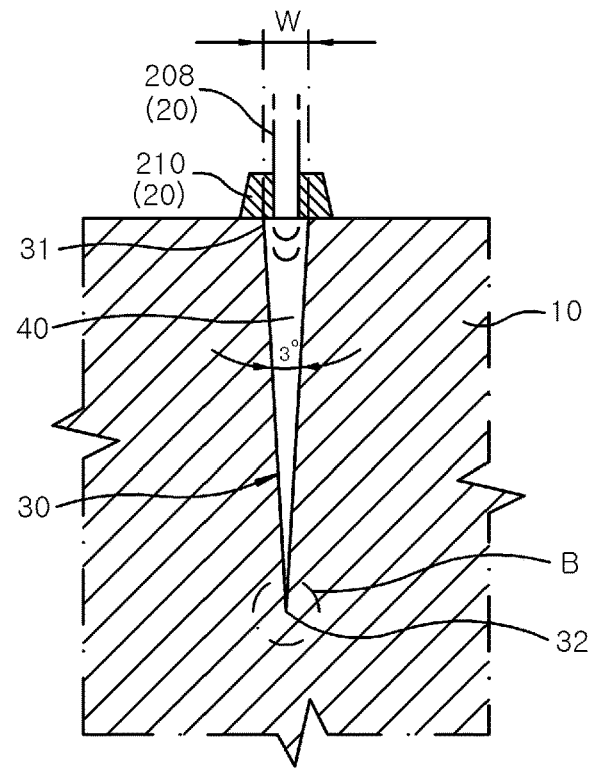
FIG. 2 is a side cross sectional view taken along a line A-A of FIG. 1 and shows a state in which vibration is applied to the crack according to an embodiment of the present disclosure.
Figure 3:
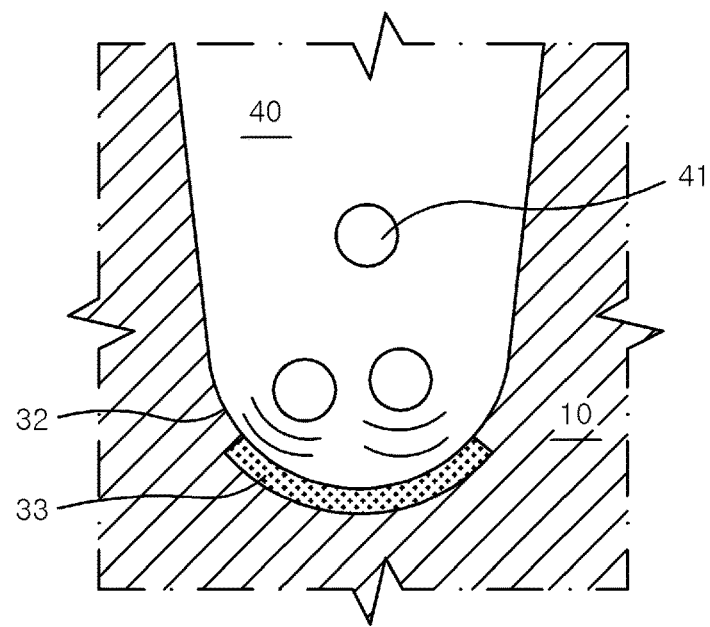
FIG. 3 is an enlarged view of a portion "B" in FIG. 2, which shows an inner end portion of the crack.
Figure 4:
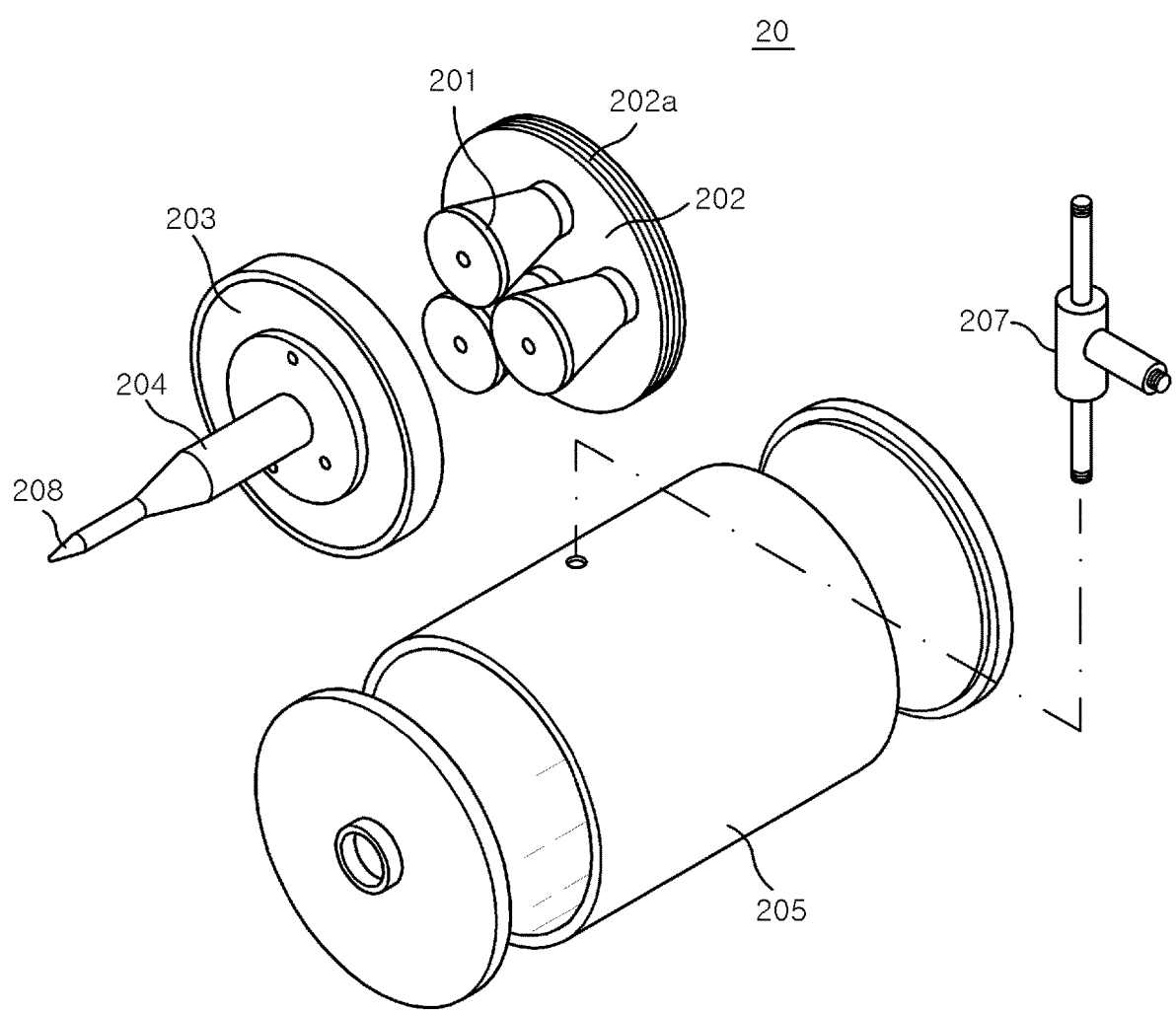
FIG. 4 is a conceptual diagram of a vibration applying device for applying vibration according to the embodiment of the present disclosure.
Figure 5:
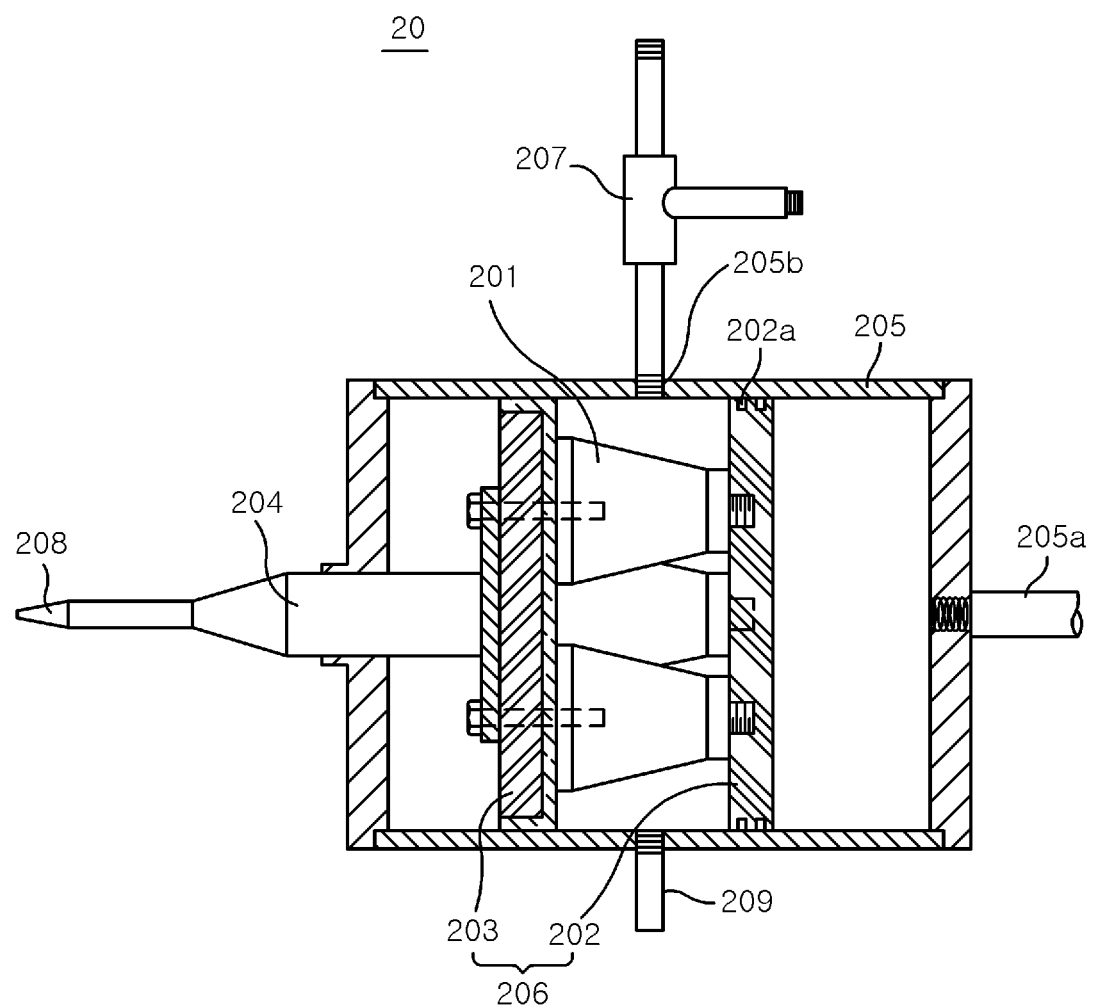
FIG. 5 is a side cross sectional view of the vibration applying device shown in FIG. 4.
Figure 6:
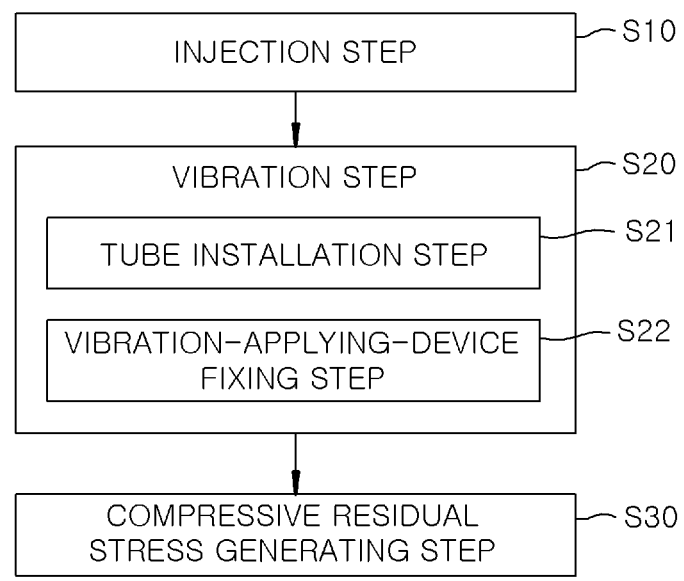
FIG. 6 is a flowchart showing a process of suppressing crack growth according to the embodiment of the present disclosure.

Hereinafter, a method for suppressing a crack growth in a wall portion according to an embodiment will be described with reference to FIGS. 1 to 6. FIG. 1 is a conceptual diagram showing a crack generated on a surface of a target object. FIG. 2 is a side cross sectional view showing a state in which vibration is applied to the crack according to the embodiment of the present disclosure. FIG. 3 is an enlarged view showing a portion "B" in FIG. 2, which shows an inner end portion of the crack. FIG. 4 is a conceptual diagram of a vibration applying device for applying vibration according to the embodiment of the present disclosure. FIG. 5 is a cross sectional view of the vibration applying device shown in FIG. 4. FIG. 6 is a flowchart showing a process of suppressing the crack growth according to the embodiment of the present disclosure.

Referring to FIGS. 1 to 6, the method of suppressing a crack growth in a wall portion according to one embodiment may be applied to a surface cracking. A crack 30 may be generated on and into a surface of a target object 10, such as an aircraft, a reactor pressure vessel, or the like. The target object 10 may be a metallic member, but is not limited thereto. The crack 30 may be formed in various shapes and at various angles. For example, a width w of the crack 30 at the surface of the target object 10 may be 5 mm or less. Here, the width w of the crack is defined as a gap in a direction perpendicular to a depth direction of the crack into the surface of the target object 10. Further, the width w of the crack 30 is narrowed as the crack grows (develops) inwardly from the surface of the target object 10. The crack 30 may form an angle of about 3° while developing inwardly from the surface of the target object 10.

In order to perform the crack repairing method for suppressing a crack growth according to one embodiment, working fluid 40 may be injected into the crack 30 (step S10). The working fluid 40 may be liquid having a predetermined surface tension, e.g., water. The working fluid 40 injected into the crack 30 is maintained by the surface tension without leaking out of the crack 30. Next, vibration is applied toward an inner end portion (crack-tip) 32 of the crack 30 (step S20). The vibration in the step S20 may be, e.g., ultrasonic waves, and an ultrasonic generator having a tip(s) may be used as a vibration applying device 20. Hereinafter, the vibration applying device 20 will be described with reference to FIGS. 4 and 5.

Referring to FIGS. 4 and 5, the vibration applying device 20 may include a vibrator 201, a support plate 202 to which the vibrator 201 is fixed, a booster 203, a plunger 204 to which a tip 208 is fixed, a pneumatic cylinder 205, and the tip 208. The vibrator 201 may be connected to an oscillator. When the ultrasonic generator is used as the vibration applying device 200, the oscillator connected to the vibrator 201 may be an ultrasonic oscillator. The circular booster 203 is configured to boost a vibration output of an ultrasonic vibration of the vibrator 201, and the booster 203 is in close contact with a front surface of the vibrator 201. The plunger 204 to which the tip 208 is fixed is in close contact with a front surface of the booster 203. The pneumatic cylinder 205 serves as a housing to cover the vibrator 201, the support plate 202, the booster 203 and the plunger 204.

The support plate 202 and the booster 203 constitute a vibration actuator 206. The vibration actuator 206 is installed in the pneumatic cylinder 205. An air pipe connected to a compressor (not shown) is connected to a rear plate of the pneumatic cylinder 205 through an air inlet port 205a so that air introduced from the air pipe is supplied into the pneumatic cylinder 205 through the air inlet port 205a. The plunger 204 extends through a front plate of the pneumatic cylinder 205 and projects to the outside of the pneumatic cylinder 205.

A vortex tube 207 serving as a cooling mechanism is connected to an air inlet port 205b provided at one side of the pneumatic cylinder 205 in an intermediate position of the vibration actuator 206. For example, the vortex tube 207 may be configured in such a manner that a lower pipe of the vortex tube 207 is connected to the pneumatic cylinder 205 to discharge cold air to the outside, an intermediate pipe of the vortex tube 207 is connected to the compressor, and an upper pipe of the vortex tube 207 is connected to an air supplier to receive high-temperature air. The high-temperature air supplied from the vortex tube 207 is sprayed to the target object 10 through the tip 208, thereby increasing the temperature of the target object 10. Further, a gas exhaust port 209 for exhausting air heated by heat exchange of cooling air of the vibrator 201 can be disposed at the other side of the pneumatic cylinder 205.

A sealing groove is formed at an outer peripheral surface of the support plate 202 constituting the vibration actuator 206 to have a sealing 202a therein. A sealing groove may be formed at an outer peripheral surface of the booster 203 to have a sealing therein. With such configuration, it is possible to maintain airtightness between the support plate 202 and an inner peripheral surface of the pneumatic cylinder 205 and airtightness between the booster 203 and the inner peripheral surface of the pneumatic cylinder 205.

The vibration applying device 20 described above is installed at the crack 30 to vibrate the working fluid in the crack 30. In other words, the step S20 of the vibration application may include a tube installation step S21 and a vibration-applying-device fixing step S22. In the tube installation step S21, prior to the vibration application to the working fluid in the crack 30, the tip 208 of the vibration applying device 20 is disposed at an crack initiation portion 31 of the crack 30 on the surface of the target object 10 such that the tip 208 is substantially perpendicular to the surface of the target object 10. The tip 208 may be installed together with a fixing tube 210. In other words, in order to apply the vibration to the crack 30, the fixing tube 210 may be installed first at the crack initiation portion 31 in the tube installation step S21. After the tube installation step S21, the tip 208 of the vibration applying device 20 is fixed to the crack initiation portion 31 of the crack 30 through the fixing tube 210 in the vibration-applying-device fixing step S22. In the vibration-applying-device fixing step S22, the tip 208 may be inserted into the crack 30 through the fixing tube 210. In other words, a portion of the tip 208 which projects toward the crack 30 through the fixing tube 210 may be inserted into the crack 30 or may be disposed near the crack initiation portion 31 of the crack 30. When the vibration applying device 20 is fixed, the tip 208 of the vibration applying device 20 is operated to vibrate the working fluid in the crack 30. Since the tip 208 is disposed and fixed at the crack initiation portion 31 through the fixing tube 210, the vibration generated from the tip 208 can be more stably and effectively applied to the crack 30.

If the crack is large, parallel processing is required to generate compressive residual stress by applying the vibration multiple times. In order for such a parallel processing, the vibration applying device may include multiple tips 208. The multiple tips 208 may be arranged at an interval greater than or equal to $1/100$ and smaller than or equal to $1/5$ of a wavelength of the applied vibration. For example, if the wavelength of the vibration is about 5 cm, the interval (distance) between the multiple tips of the vibration applying device 208 may be about 1 cm or less. As the interval between the multiple tips becomes smaller, the stress is more uniformly concentrated. A frequency of the vibration generated by the vibration applying device may be about 20 kHz or more and 40 kHz or less, and the compressive residual stress can be more effectively generated at such a frequency. However, such a frequency is merely an example, and the scope of the present disclosure is not limited thereto.

By applying the vibration to the working fluid 40 in the crack 30, the compressive residual stress can be generated at the inner end portion (crack-tip) 32 of the crack 30 (step S30).

Hereinafter, the effect of the above-described method for suppressing the crack growth of the crack in the wall portion will be described.

The compressive residual stress is generated at the inner end portion (crack-tip) 32 of the crack 30 by applying the vibration to the working fluid 40 in the crack 30. In other words, an amplitude of the vibration applied by the vibration applying device becomes the maximum at the inner end portion 32 of the crack 30. A cavity(s) 41 is generated in the working fluid 40 at the inner end portion 32 of the crack where the amplitude of the vibration becomes the maximum. Shock waves generated from cavity implosion form a plastic deformation portion 33 at the inner end portion 32 of the crack 30, which leads to produce the compressive residual stress at the inner end portion 32. The compressive residual stress attenuates tensile force intensively generated at the inner end portion 32 of the crack 30, which makes it possible to suppress the crack growth.

Although the method for suppressing the crack growth in the wall portion according to one embodiment has been described, the above-described embodiment is merely an example and the present disclosure is not limited thereto, and it should be construed that the embodiments have the full range of the basic spirit disclosed herein. Further, without departing from the scope of the present disclosure, those skilled in the art can implement a pattern of a shape not mentioned herein by combining and substituting the embodiments disclosed herein. Further, those skilled in the art can easily change or modify the embodiments disclosed herein based on the description, and such changes or modifications should fall within the scope of the present disclosure defined by the appended claims.

What is claimed is:

1. A method for suppressing a crack growth in a wall portion, the method comprising:
    injecting working fluid into a crack formed at a surface of the wall portion of a target object;
    generating a vibration at a portion of the working fluid disposed in a crack-initiated portion of the crack and transferring the vibration toward an inner end portion of the crack through the working fluid, thereby vibrating the entire working fluid in the crack; and
    generating at least one cavity in the working fluid within the crack adjacent to the inner end portion of the crack by the applied vibration and generating compressive residual stress at the inner end portion of the crack by shock waves generated from cavity implosion of the at least one cavity.

2. The method of claim 1, wherein the generating of the vibration includes:
    installing a fixing tube at the crack-initiated portion of the crack; and
    fixing one or more tips of a vibration applying device at the crack through the fixing tube, the one or more tips being included in the vibration applying device which is configured to generate ultrasonic waves,
    wherein the vibration is applied by using the one or more tips of the vibration applying device.

3. The method of claim 2, wherein the one or more tips of the vibration applying device include multiple tips to perform parallel processing, and
    a distance between the multiple tips of the vibration applying device is greater than or equal to $1/100$ and smaller than or equal to $1/5$ of a wavelength of the vibration applied by the vibration applying device.

* * * * *